US010654552B2

(12) United States Patent
Lee et al.

(10) Patent No.: US 10,654,552 B2
(45) Date of Patent: May 19, 2020

(54) FUEL SUPPLY SYSTEM AND METHOD FOR SHIP ENGINE

(71) Applicant: DAEWOO SHIPBUILDING & MARINE ENGINEERING CO., LTD., Seoul (KR)

(72) Inventors: Chang Woo Lee, Seoul (KR); Dong Chan Kim, Goyang-si (KR); Young Sik Moon, Gwangmyeong-si (KR); Nam Soo Kim, Suwon-si (KR)

(73) Assignee: DAEWOO SHIPBUILDING & MARINE ENGINEERING CO., LTD., Seoul (KR)

( * ) Notice: Subject to any disclaimer, the term of this patent is extended or adjusted under 35 U.S.C. 154(b) by 157 days.

(21) Appl. No.: 15/547,446

(22) PCT Filed: Jan. 30, 2015

(86) PCT No.: PCT/KR2015/001029
§ 371 (c)(1),
(2) Date: Jul. 28, 2017

(87) PCT Pub. No.: WO2016/122026
PCT Pub. Date: Aug. 4, 2016

(65) Prior Publication Data
US 2018/0022431 A1 Jan. 25, 2018

(51) Int. Cl.
*B63H 21/38* (2006.01)
*F02M 37/04* (2006.01)
(Continued)

(52) U.S. Cl.
CPC .............. *B63H 21/38* (2013.01); *B63B 25/14* (2013.01); *B63H 21/14* (2013.01); *F02B 73/00* (2013.01);
(Continued)

(58) Field of Classification Search
CPC .. B63H 21/14; F02M 21/02; B63B 2035/448; F17C 2221/033; F17C 2250/0439;
(Continued)

(56) References Cited

U.S. PATENT DOCUMENTS 6,058,713 A * 5/2000 Bowen ................... B23K 9/173
62/7
9,581,296 B2 * 2/2017 Lee ........................ F17C 13/002
(Continued)

FOREIGN PATENT DOCUMENTS

CN 103010447 A 4/2013
CN 103620202 A 3/2014
(Continued)

OTHER PUBLICATIONS

Office Action of corresponding Chinese Patent Application No. 201580078008.2—9 pages (dated Jan. 28, 2019).
(Continued)

*Primary Examiner* — Cassey D Bauer
*Assistant Examiner* — Jenna M Hopkins
(74) *Attorney, Agent, or Firm* — Knobbe Martens Olson & Bear LLP

(57) ABSTRACT

Disclosed are a fuel supply system and method for a ship engine. The fuel supply system for a ship engine of the present invention comprises: a submersible pump which is provided to an LNG storage tank of a ship for supplying LNG to the engine of the ship; a high-pressure pump which has the LNG supplied thereto from the submersible pump and pressurizes the same under high pressure; and a return flow channel which, at the upstream of the high-pressure pump, returns the LNG to the LNG storage tank, wherein the flow of the LNG returning through the return flow channel is controlled, and the temperature of the LNG is controlled at the front end of the high-pressure pump.

12 Claims, 2 Drawing Sheets

(51) Int. Cl.
| | |
|---|---|
| *F02M 21/02* | (2006.01) |
| *B63H 21/14* | (2006.01) |
| *F02B 73/00* | (2006.01) |
| *F17C 9/00* | (2006.01) |
| *F17C 3/02* | (2006.01) |
| *F17C 9/02* | (2006.01) |
| *F17C 13/02* | (2006.01) |
| *B63B 25/14* | (2006.01) |
| *F02M 21/06* | (2006.01) |

(52) U.S. Cl.
CPC ........ *F02M 21/02* (2013.01); *F02M 21/0239* (2013.01); *F02M 21/0287* (2013.01); *F02M 37/04* (2013.01); *F17C 3/022* (2013.01); *F17C 3/025* (2013.01); *F17C 9/00* (2013.01); *F17C 9/02* (2013.01); *F17C 13/025* (2013.01); *F17C 13/026* (2013.01); *F02M 21/0215* (2013.01); *F02M 21/0221* (2013.01); *F02M 21/0245* (2013.01); *F02M 21/06* (2013.01); *F17C 2250/0439* (2013.01); *F17C 2250/061* (2013.01); *F17C 2250/0636* (2013.01); *F17C 2260/021* (2013.01); *F17C 2265/066* (2013.01); *F25B 2600/05* (2013.01); *F25B 2600/13* (2013.01); *F25B 2600/25* (2013.01); *Y02T 10/32* (2013.01); *Y02T 70/5218* (2013.01)

(58) Field of Classification Search
CPC ........ F17C 2250/0636; F17C 2250/061; F17C 2260/021; F17C 2265/066; F17C 9/02; F17C 3/026; F17C 3/025; F17C 3/022; F17C 13/026; F17C 13/025; F25B 2700/21; F25B 2600/13; F25B 2600/05; F25B 2600/25
See application file for complete search history.

(56) References Cited

U.S. PATENT DOCUMENTS

| | | | | |
|---|---|---|---|---|
| 2006/0222523 A1* | 10/2006 | Valentian | ........... | F17C 7/04 417/313 |
| 2008/0276627 A1 | 11/2008 | Lee et al. | | |
| 2011/0056570 A1* | 3/2011 | Bayliff | ........... | F17C 7/00 137/14 |
| 2013/0340474 A1* | 12/2013 | Jung | ........... | F02M 21/0215 62/611 |
| 2014/0053600 A1* | 2/2014 | Jung | ........... | F02M 21/0215 62/611 |
| 2014/0060110 A1* | 3/2014 | Jung | ........... | F02M 21/0227 62/611 |
| 2014/0069117 A1* | 3/2014 | Jung | ........... | F02M 21/0245 62/7 |
| 2014/0069118 A1* | 3/2014 | Jung | ........... | F17C 7/04 62/48.1 |
| 2014/0150470 A1* | 6/2014 | Han | ........... | F02M 21/06 62/49.1 |
| 2014/0174105 A1* | 6/2014 | Gerstler | ........... | F17C 13/00 62/48.2 |
| 2014/0230459 A1* | 8/2014 | Kim | ........... | F02M 21/06 62/50.6 |
| 2014/0261327 A1 | 9/2014 | Archer et al. | | |
| 2014/0290279 A1 | 10/2014 | Lee et al. | | |
| 2014/0290280 A1 | 10/2014 | Lee | | |
| 2014/0311591 A1* | 10/2014 | Drube | ........... | F04B 15/08 137/340 |
| 2014/0311622 A1* | 10/2014 | Cohen | ........... | F17C 5/06 141/4 |
| 2015/0121859 A1* | 5/2015 | Kim | ........... | F02M 21/0215 60/327 |
| 2015/0121903 A1* | 5/2015 | Scheuring | ........... | F17C 7/04 62/48.1 |
| 2015/0184617 A1* | 7/2015 | Kim | ........... | F02M 21/0245 123/472 |
| 2015/0184618 A1* | 7/2015 | Lee | ........... | F02M 21/0245 123/495 |
| 2018/0022431 A1* | 1/2018 | Lee | ........... | B63H 21/14 123/495 |

FOREIGN PATENT DOCUMENTS

| | | | |
|---|---|---|---|
| EA | 015984 B1 | 1/2012 | |
| FR | 2920484 A1 | 3/2009 | |
| JP | 2014-194272 A | 10/2014 | |
| KR | 10-2012-0092323 A | 8/2012 | |
| KR | 10-2013-0019444 A | 2/2013 | |
| KR | 10-1258932 B1 | 4/2013 | |
| KR | 10-1350803 B1 | 1/2014 | |
| KR | 10-1434431 B1 | 9/2014 | |
| KR | 20140127460 A * | 11/2014 | |
| KR | 10-2014-0137730 A | 12/2014 | |
| KR | 10-2015-0081546 A | 7/2015 | |
| RU | 128249 U1 | 5/2013 | |
| WO | 98/59164 A2 | 12/1998 | |
| WO | WO-2005058692 A1 * | 6/2005 | ............. B63J 99/00 |

OTHER PUBLICATIONS

Office Action of corresponding Japanese Patent Application No. 2017-540086—3 pages (dated Oct. 30, 2018).

Office Action of corresponding Russian Patent Application No. 2017130498/06(053074—9 pages (dated Jul. 6, 2018).

Office Action of corresponding Singapore Patent Application No. 11201706177P—7 pages (dated Jun. 7, 2018).

Extended European Search Report of corresponding Patent Application No. 15880207.4—7 pages (dated Jun. 12, 2018).

International Search Report dated Oct. 29, 2015 of PCT/KR2015/001029 which is the parent application—2 pages.

Office Action of corresponding Indonesian Patent Application No. P00201705018—2 pages (dated Oct. 2, 2019).

* cited by examiner

FUEL SUPPLY SYSTEM AND METHOD FOR SHIP ENGINE

TECHNICAL FIELD

The present invention relates to a fuel supply system and method for a ship engine, and, more particularly, to a fuel supply system and method for a ship engine in which LNG is delivered from an LNG storage tank of a ship to a high-pressure pump by a submerged pump and then pressurized to a high pressure by high-pressure pump, followed by re-gasifying the LNG pressurized by the high-pressure pump and supplying the re-gasified LNG to the ship engine, wherein LNG upstream of the high-pressure pump is returned to the LNG storage tank to secure a minimum flow rate of the submerged pump, and a flow rate of LNG to be returned is regulated to control a temperature of LNG in front of the high-pressure pump, thereby preventing boil-off gas from flowing into the high-pressure pump.

BACKGROUND ART

Recently, consumption of liquefied gas such as liquefied natural gas (LNG) and liquefied petroleum gas (LPG) has been rapidly increasing worldwide.

In particular, liquefied natural gas (hereinafter, "LNG") is an eco-friendly fuel with low emission of air pollutants during combustion and is increasingly used in various fields.

LNG is a colorless transparent liquid which can be obtained by cooling natural gas containing methane as a main component to about −162° C. and has a volume of about 1/600 that of natural gas. Thus, liquefaction of natural gas into LNG enables very efficient transportation of natural gas. For example, LNG carriers are used to transport (carry) LNG by sea.

As international and domestic regulation standards for ships become increasingly strict, there is growing interest in eco-friendly high-efficiency fuels for ships. Particularly, a dual fuel diesel electric engine (DFDE) that can be fueled by a gas generated by natural or forced evaporation of LNG was developed and put into use.

Such a ship fueled by LNG is referred to as an LNG fueled ship (LFS). With tightened international emission standards for ships and stabilization of LNG prices, consumption of LNG as a marine fuel is expected to increase.

DISCLOSURE

Technical Problem

It is an aspect of the present invention to provide a system for supplying LNG to a ship engine as fuel, which can prevent system failure, thereby enabling smooth fuel supply.

Technical Solution

In accordance with one aspect of the present invention, a fuel supply system for a ship engine includes: a submerged pump disposed in an LNG storage tank of a ship and supplying LNG to the ship engine;

a high-pressure pump receiving LNG from the submerged pump and pressurizing the LNG to a high pressure; and a return channel for returning LNG upstream of the high-pressure pump to the LNG storage tank, wherein a flow rate of LNG returned through the return channel is regulated to control a temperature of LNG in front of the high-pressure pump.

Preferably, the fuel supply system further includes: a flow control valve disposed in the return channel; a flow controller controlling a flow rate of LNG returned to the LNG storage tank to secure a minimum flow rate of the submerged pump; and a temperature controller detecting a temperature of LNG in front of the high-pressure pump and controlling the flow rate of LNG returned to the LNG storage tank to maintain the temperature of LNG in front of the high-pressure pump below a liquefaction temperature of LNG, wherein the flow control valve controls the flow rate of LNG returned to the LNG storage tank under control of the flow controller and the temperature controller.

Preferably, the fuel supply system further includes: a fuel supply channel for supplying LNG from the LNG storage tank to the engine; and a vaporizer disposed in the fuel supply channel, re-gasifying pressurized LNG from the high-pressure pump, and supplying re-gasified LNG to the engine.

Preferably, the engine is a high-pressure gas injection engine fueled by a high-pressure gas compressed to a high pressure of 150 bar to 400 bar.

Preferably, the LNG storage tank is a pressure-resistant tank and has a design pressure set to retain BOG or flash gas generated in the pressure-resistant tank during operation of the ship.

In accordance with another aspect of the present invention, a fuel supply method for a ship engine includes: delivering LNG from an LNG storage tank of a ship to a high-pressure pump by the submerged pump; pressurizing the LNG to a high pressure by the high-pressure pump; re-gasifying the LNG pressurized by the high-pressure pump; and supplying the re-gasified LNG to the ship engine, wherein LNG upstream of the high-pressure pump is returned to the LNG storage tank to secure a minimum flow rate of the submerged pump, and a flow rate of LNG to be returned is regulated to control a temperature of LNG in front of the high-pressure pump.

Preferably, the flow rate of LNG returned to the LNG storage tank is regulated to maintain the temperature of LNG in front of the high-pressure pump below a liquefaction temperature of LNG.

Preferably, the engine is a high-pressure gas injection engine fueled by a high-pressure gas compressed to a high pressure of 150 bar to 400 bar.

Advantageous Effects

The present invention provides a fuel supply system for a ship engine in which LNG is delivered from an LNG storage tank of a ship to a high-pressure pump by a submerged pump and then pressurized to a high pressure by high-pressure pump, followed by re-gasifying the LNG pressurized by the high-pressure pump and supplying the re-gasified LNG to the ship engine, wherein LNG upstream of the high-pressure pump is returned to the LNG storage tank to secure a minimum flow rate of the submerged pump, and a flow rate of LNG to be returned is regulated to control a temperature of LNG in front of the high-pressure pump. Since LNG in front of the high-pressure pump can remain supercooled through control of the flow rate of LNG returned to the LNG storage tank, it is possible to prevent boil-off gas from flowing into the high-pressure pump, thereby preventing system failure and enabling smooth fuel supply.

EMBODIMENTS

Figure 1:
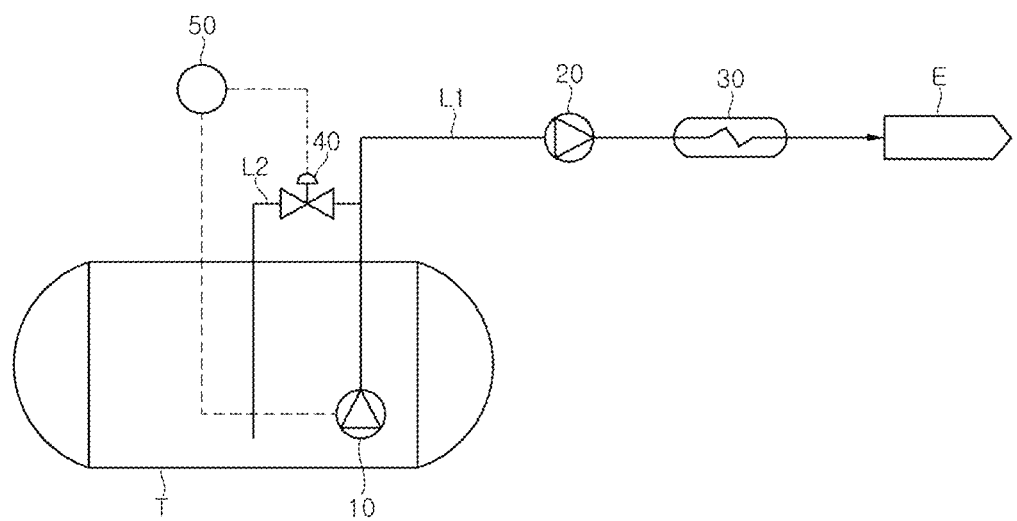
FIG. 1 is a diagram of an example of a system for supplying LNG to a ship engine.

The above and other aspects, features, and advantages of the present invention will become apparent from the detailed description of the following embodiments in conjunction with the accompanying drawings.

Hereinafter, embodiments of the present invention will be described in detail with reference to the accompanying drawings. It should be noted that like components will be denoted by like reference numerals throughout the specification and the accompanying drawings.

FIG. 1 is a diagram of an example of a system for supplying LNG to a ship engine. In this system, LNG stored in a storage tank T is pumped to a high-pressure pump 20 provided in a supply channel L1 by a delivery pump 10. Then, the LNG pressurized by the high-pressure pump 20 is re-gasified by a vaporizer 30 and supplied to a ship engine E as fuel. Here, in order to secure a minimum flow rate of the delivery pump 10, which is a submerged pump, the system is provided with a return channel L2 for returning LNG to the storage tank T. The amount of LNG returned to the tank through the return channel L2 may be regulated by controlling a valve 40 disposed in the return channel L2 through a flow controller 50 based on the amount of current consumed by the delivery pump 10.

Figure 2:
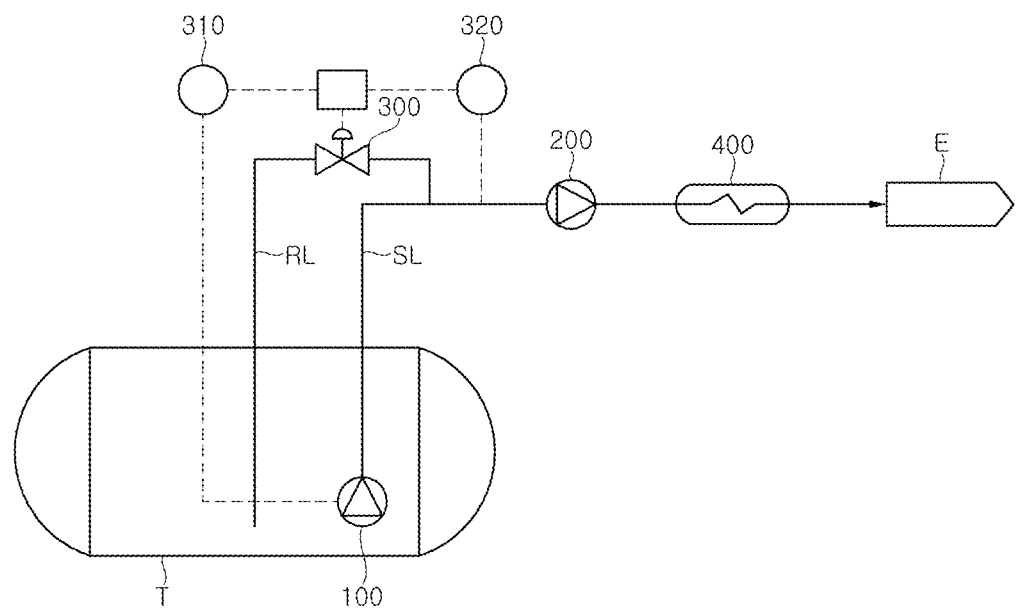
FIG. 2 is a schematic diagram of a fuel supply system for a ship engine according to one embodiment of the present invention.

FIG. 2 is a schematic diagram of a fuel supply system for a ship engine according to one embodiment of the present invention, which is an improvement of the aforementioned fuel supply system.

Referring to FIG. 2, a fuel supply system according to this embodiment includes a submerged pump 100 disposed in an LNG storage tank T of a ship and supplying LNG to an engine E of the ship, a high-pressure pump 200 receiving LNG from the submerged pump 100 and pressurizing the LNG to a high pressure, and a return channel RL for returning LNG upstream of the high-pressure pump 200 to the LNG storage tank T to secure a minimum flow rate of the submerged pump 100, wherein a temperature of LNG in front of the high-pressure pump 200 is controlled by regulating a flow rate of LNG returned through the return channel RL.

Even when the flow rate of the submerged pump 100 meets the minimum flow rate requirement, LNG in front of the high-pressure pump 200 can vaporize, thereby generating boil-off gas, when there is a large amount of heat input from the outside. If the boil-off gas flows into the high-pressure pump 200, this may cause failure of the pump and eventually interruption of fuel supply to the engine E. In order to prevent such a problem, in this embodiment, the temperature of LNG in front of the high-pressure pump 200 is controlled by regulating the flow rate of LNG returned to the LNG storage tank T.

The return channel RL branches off upstream of the high-pressure pump 200 as close as possible to the high-pressure pump 200, whereby a flow rate of LNG before the high-pressure pump 200 can be as high as possible, and temperature rise due to heat input from the outside can be reduced, thereby preventing generation of boil-off gas.

The return channel RL is provided with a flow control valve 300 to control the flow rate of LNG returned to the storage tank. The flow control valve 300 controls the flow rate of the LNG returned to the LNG storage tank T under control of a flow controller 310 and a temperature controller 320.

The flow controller 310 controls the flow rate of LNG returned to the LNG storage tank T to secure a minimum flow rate of the submerged pump 100. The flow controller 310 may determine the flow rate of LNG required for securing the minimum flow rate of the submerged pump based on the amount of current consumed by the submerged pump 100.

The temperature controller 320 detects the temperature of LNG in front of the high-pressure pump 200 and determines the flow rate of LNG returned to the LNG storage tank T required to lower the temperature LNG in front of the high-pressure pump 200 below a liquefaction temperature of LNG, that is, to allow LNG in front of the high-pressure pump 200 to remain supercooled.

When LNG is returned to the LNG storage tank T and the amount of LNG supplied by the submerged pump 100 increases, temperature rise due to heat input from the outside is relatively suppressed, such that LNG in front of the high-pressure pump 200 can be prevented from vaporizing.

The flow control valve 300 determines the higher of two output values obtained based on control signals from the flow controller 310 and the temperature controller 320 as a flow rate of LNG to be returned to the LNG storage tank T, thereby allowing LNG to be returned to the LNG storage tank T at the determined flow rate. That is, even when the flow rate of the submerged pump 100 signaled by the flow controller 310 is higher than the minimum flow rate, if the temperature of LNG in front of the high-pressure pump 200 is higher than a setting point, a flow rate of LNG returned to the storage tank T is increased based on the signal of the temperature controller 320, thereby allowing LNG in front of the high-pressure pump 200 to remain supercooled. For example, if the minimum flow rate of the submerged pump 100 is 5 m$^3$/h and the temperature LNG in front of the high-pressure pump 200 is higher than a setting point of −155° C., which is lower than a saturation temperature of LNG, the flow rate of LNG to be returned is increased, thereby allowing the temperature of LNG in front of the high-pressure pump 200 to be kept low.

The fuel supply system according to the present invention may further include a control unit (not shown) receiving control signals from the flow controller 310 and the temperature controller 320 and controlling the flow control valve 300 based on the control signals.

In addition to the high-pressure pump 200, a vaporizer 400 receiving and re-gasifying LNG pressurized by the high-pressure pump 200 and supplying the re-gasified LNG to the engine E is disposed in a fuel supply channel SL for supplying LNG from the LNG storage tank T to the engine E.

In this embodiment, the engine E is a high-pressure gas injection engine that is fueled by a high-pressure gas compressed to a high pressure of 150 bar to 400 bar, and may be an engine for propulsion or power generation of the ship, for example, an ME-GI engine.

An ME-GI engine is a 2-stroke high-pressure natural gas injection engine that was developed to reduce emissions of nitrogen oxide ($NO_x$) and sulfur oxide ($SO_x$) and can use gases and oils as fuel, and is fueled by a gas compressed to 150 bar to 400 bar.

Such an ME-GI engine can reduce pollutant emissions by 23% for carbon dioxide, 80% for nitrogen compounds, and 95% for sulfur compounds, as compared with a diesel engine of equivalent power output.

Thus, when an engine for propulsion or power generation using LNG as fuel is provided to the ship as in this embodiment, emission of air pollutants can be reduced.

Since LNG pressurized to 150 bar to 400 bar by the high-pressure pump 200 to be supplied to the high-pressure gas injection engine is in a supercritical state, re-gasification of LNG by the vaporizer 400 does not mean that the LNG undergoes a phase change, but rather means that thermal energy is supplied to the LNG.

In this embodiment, the LNG storage tank T is a pressure-resistant tank. Such a pressure-resistant tank may have a design pressure set to hold BOG or flash gas generated therein during operation of the ship. The design pressure of the pressure-resistant tank is set to a gauge pressure of 2 bar or higher, preferably 3 bar to 30 bar. In this embodiment, the pressure-resistant tank may be an independent storage tank, preferably an IMO C-type tank.

Figure 3:
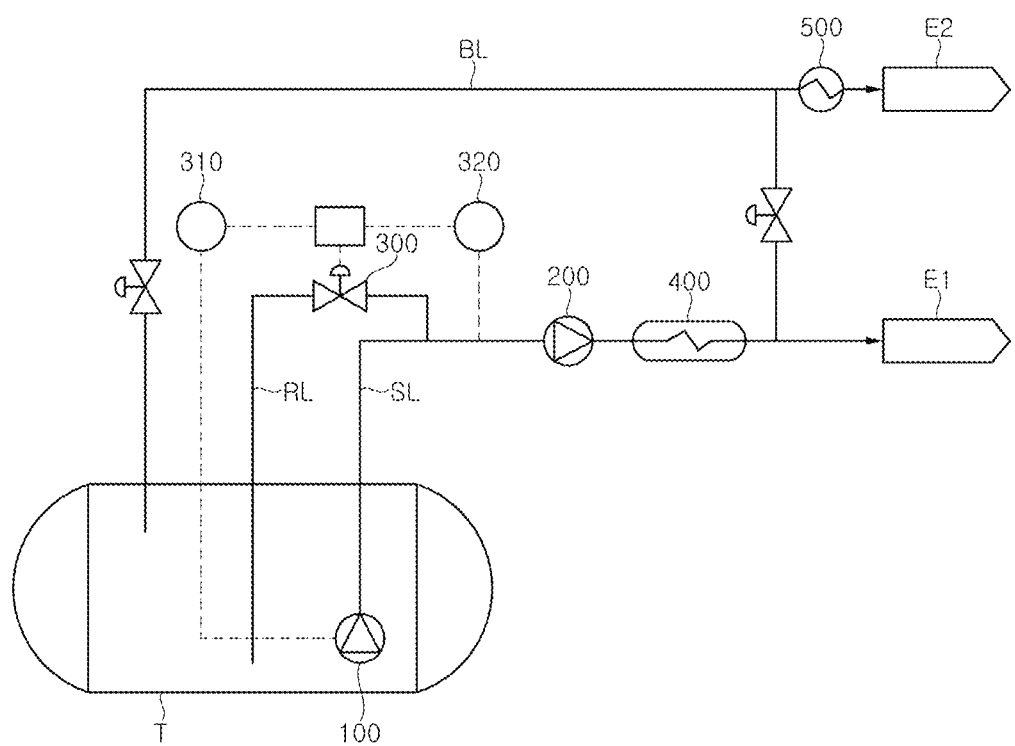
FIG. 3 is a diagram of a modification of the fuel supply system for a ship engine of FIG. 2.

When the LNG storage tank T is a pressure-resistant tank, the fuel supply system may further include a second engine E2 that is fueled by BOG generated in the LNG storage tank T. FIG. 3 is a diagram of a modification of the above embodiment, which further includes the second engine. The second engine E2 is a low-pressure gas engine that is driven at a lower pressure than the ship engine as described above, that is, the first engine E1. Thus, BOG can be supplied at a pressure required to operate the second engine using only the internal pressure of the LNG storage tank T without using a separate compressor.

The second engine E2 may be, for example, a DF engine supplied with fuel gas at 3 bar to 20 bar. In addition, the fuel supply system may further include a BOG supply line BL for supplying BOG from the LNG storage tank T to the second engine and a heater 500 heating BOG.

As described above, in the fuel supply system according to the present invention, LNG is delivered from an LNG storage tank of a ship to a high-pressure pump by a submerged pump and then pressurized to a high pressure by high-pressure pump, followed by re-gasifying the LNG pressurized by the high-pressure pump and supplying the re-gasified LNG to the ship engine E, wherein LNG upstream of the high-pressure pump 200 is returned to the LNG storage tank T to secure a minimum flow rate of the submerged pump 100, and a flow rate of LNG to be returned is regulated to control a temperature of LNG in front of the high-pressure pump 200, that is, to allow the LNG in front of the high-pressure pump 200 to remain supercooled below a liquefaction temperature of LNG.

The ship engine E supplied with fuel through the high-pressure pump may be a high-pressure gas injection engine that is fueled by a high-pressure gas compressed to a high pressure of 150 bar to 400 bar, for example, an ME-GI engine.

Although the present invention has been described with reference to some embodiments in conjunction with the accompanying drawings, it should be understood that various modifications, changes, alterations, and equivalent embodiments can be made by those skilled in the art without departing from the spirit and scope of the invention.

The invention claimed is:

1. A system of a ship, comprising;
 a liquefied natural gas (LNG) storage tank configured to contain LNG;
 a discharge pump located inside the LNG storage tank and configured to discharge LNG contained in the LNG storage tank;
 a high-pressure pump configured to pressurize LNG from the LNG storage tank;
 an LNG transfer line between the discharge pump and the high-pressure pump;
 a LNG return line branched off the LNG transfer line and configured to return LNG to the LNG storage tank from a branch location of the LNG transfer line, wherein the branch location is located outside the LNG storage tank;
 a flow control valve provided on the LNG return line and configured to regulate a flow rate of LNG in the LNG return line; and
 one or more controllers configured to control the discharge pump and the flow control valve for discharging LNG from the LNG storage tank, returning a first portion of LNG flowing in the LNG transfer line to the LNG storage tank, and supplying a second portion of LNG flowing in the LNG transfer line to the high-pressure pump,
 wherein, when the second portion supplied to the high-pressure pump is at a temperature higher than a predetermined temperature, the one or more controllers are configured:
  to control the discharge pump to increase a discharge flow rate of LNG discharged at the discharge pump to inhibit the temperature of the LNG flowing in the LNG transfer line from increasing to the boiling point of LNG for minimizing boil-off gas generation in the LNG transfer line and further for avoiding a supply of boil-off gas to the high-pressure pump, and
  to control the flow control valve to increase a return flow rate of the first portion of LNG returning to the LNG storage tank in view of the increased discharge flow rate.

2. A method of operating a system of a ship, the method comprising:
 discharging LNG from an LNG storage tank by a discharge pump located inside the LNG storage tank;
 supplying LNG discharged from the LNG storage tank to a high-pressure pump via an LNG transfer line;
 branching off LNG from the LNG transfer line and returning LNG to the LNG storage tank via an LNG return line;
 controlling the discharge pump and a flow control valve located at the LNG return line for discharging LNG from the LNG storage tank, returning a first portion of LNG flowing in the LNG transfer line to the LNG storage tank, and supplying a second portion of LNG flowing in the LNG transfer line to the high-pressure pump,
 wherein, when the second portion supplied to the high-pressure pump is at a temperature higher than a predetermined temperature, the discharge pump is controlled to increase a discharge flow rate of LNG discharged at the discharge pump to inhibit the temperature of the LNG flowing in the LNG transfer line from increasing to the boiling point of LNG for minimizing boil-off gas generation in the LNG transfer line and further for avoiding a supply of boil-off gas to the high-pressure pump, and further the flow control valve is controlled to increase a return flow rate of the first portion of LNG returning to the LNG storage tank in view of the increased discharge flow rate.

3. The method of claim 2, wherein the LNG return line is branched off at a branch location of the LNG transfer line which is closer to the high-pressure pump than the discharge pump.

4. The method of claim 3, further comprising detecting the temperature of the second portion of LNG at a point between the branch location and the high-pressure pump.

5. The method of claim 2, wherein the predetermined temperature is lower than the boiling point of LNG.

6. The method of claim 2, wherein the high-pressure pump pressurizes the second portion of LNG to generate pressurized LNG having a pressure of 150 bar to 400 bar.

7. The method of claim 6, further comprising heating the pressurized LNG to generate supercritical state LNG for supplying the supercritical state LNG to an engine of the ship.

8. The system of claim 1, wherein the branch location is located closer to the high-pressure pump than the discharge pump.

9. The system of claim 8, further comprising a temperature detector configured to detect the temperature of the second portion of LNG at a point between the branch location and the high-pressure pump.

10. The system of claim 1, wherein the predetermined temperature is lower than the boiling point of LNG.

11. The system of claim 1, wherein the high-pressure pump is configured to pressurize the second portion of LNG to generate pressurized LNG having a pressure of 150 bar to 400 bar.

12. The system of claim 11, further comprising a heater configured to heat the pressurized LNG to generate supercritical state LNG for supplying the supercritical state LNG to an engine of the ship.

* * * * *